(12) United States Patent
Col et al.

(10) Patent No.: US 7,117,347 B2
(45) Date of Patent: Oct. 3, 2006

(54) PROCESSOR INCLUDING FALLBACK BRANCH PREDICTION MECHANISM FOR FAR JUMP AND FAR CALL INSTRUCTIONS

(75) Inventors: Gerard M. Col, Austin, TX (US); Thomas C. McDonald, Austin, TX (US)

(73) Assignee: IP-First, LLC, Fremont, CA (US)

(*) Notice: Subject to any disclaimer, the term of this patent is extended or adjusted under 35 U.S.C. 154(b) by 512 days.

(21) Appl. No.: 10/279,208

(22) Filed: Oct. 22, 2002

(65) Prior Publication Data

US 2005/0210224 A1 Sep. 22, 2005

Related U.S. Application Data

(60) Provisional application No. 60/345,454, filed on Oct. 23, 2001.

(51) Int. Cl.
*G06F 9/32* (2006.01)
(52) U.S. Cl. ................ 712/239; 711/209; 711/220; 712/238; 712/240
(58) Field of Classification Search ........... 711/209, 711/220; 712/238, 239
See application file for complete search history.

(56) References Cited

U.S. PATENT DOCUMENTS

| 5,608,886 | A | | 3/1997 | Blomgren et al. | 712/239 |
|---|---|---|---|---|---|
| 5,740,415 | A | | 4/1998 | Hara | 712/238 |
| 5,740,416 | A | * | 4/1998 | McMahan | 712/238 |
| 5,740,418 | A | | 4/1998 | Hara | 712/239 |
| 5,996,071 | A | * | 11/1999 | White et al. | 712/238 |
| 6,108,773 | A | * | 8/2000 | Col et al. | 712/237 |
| 6,609,194 | B1 | * | 8/2003 | Henry et al. | 712/238 |

OTHER PUBLICATIONS

Intel Architecture Software Developer's Manual, vol. 2: Instruction Set Reference. Intel Corporation, 1999. pp. 3-2 and 3-3.
The PowerPC Architecture: A Specification for a New Family of RISC Processors. Morgan Kauffman Publishers, Inc., 1994. pp. 4, 12-15 and 22-23.

* cited by examiner

*Primary Examiner*—Kenneth S. Kim
(74) *Attorney, Agent, or Firm*—Richard K. Huffman; James W. Huffman

(57) ABSTRACT

A method and apparatus are provided for processing far jump-call branch instructions within a processor in a manner which reduces the number of stalls of the processor pipeline. The processor includes an apparatus, for providing a fallback far jump-call speculative target address that corresponds to a current far jump-call branch instruction. The microprocessor apparatus includes a far jump-call branch target buffer and a fallback speculative target address generator. The far jump-call branch target buffer stores a plurality of code segment bases and offsets corresponding to a plurality of previously executed far jump-call branch instructions, and determines if a hit for the current far jump-call branch instruction is contained therein. The fallback speculative target address generator is coupled to the far jump-call branch target buffer. In the event of a miss in the far jump-call branch target buffer, the fall back speculative target address generator generates the fallback far jump-call speculative target address from a current code segment base and a target offset, the target offset corresponding to the current far jump-call branch instruction.

15 Claims, 3 Drawing Sheets

PROCESSOR INCLUDING FALLBACK BRANCH PREDICTION MECHANISM FOR FAR JUMP AND FAR CALL INSTRUCTIONS

CROSS-REFERENCE TO RELATED APPLICATIONS

This application claims priority based on U.S. Provisional Application, Ser. No. 60/345,454, filed Oct. 23, 2001, entitled FALLBACK CODE SEGMENT BASE PREDICTION FOR FAR JUMP BRANCH TARGET BUFFER MISS.

This application is related to U.S. patent application Ser. No. 10/279,205 entitled "PROCESSOR INCLUDING BRANCH PREDICTION MECHANISM FOR FAR JUMP AND FAR CALL INSTRUCTIONS," by Gerard M. Col and Thomas C. McDonald, and filed on the same date as the present application, the disclosure thereof being incorporated herein by reference.

BACKGROUND OF THE INVENTION

1. Field of the Invention

This invention relates in general to the field of microprocessors, and more particularly to a method and apparatus for performing branch prediction on far jump and far call instructions.

2. Description of the Related Art

In information handling systems computer instructions are typically stored in successive addressable locations within a memory. When processed by a Central Processing Unit (CPU), the instructions are fetched from these consecutive memory locations and executed. Each time an instruction is fetched from memory, a program counter within the CPU is incremented so that it contains the address of the next instruction in the sequence. This is the instruction pointer or IP. Fetching of an instruction, incrementing of the program counter, and execution of the instruction continue linearly through memory until a program control instruction such as a jump on condition, a non-conditional jump or a call instruction is encountered.

A program control instruction, when executed, changes the address in the program counter and causes the flow of control to be altered. In other words, program control instructions specify conditions for altering the contents of the program counter. The change in the value of the program counter as a result of the execution of a program control instruction causes a break in the otherwise successive sequence of instruction execution. This is an important feature in digital computers since it provides control over the flow of program execution and a capability for branching to different portions of a program. Examples of program control instructions include Jump, Test and Jump conditionally, Call, and Return, which are also called branch instructions.

A Jump instruction causes the CPU to unconditionally change the contents of the program counter to a specific value, i.e., to the target address for the instruction where the program is to continue execution. A Test and Jump instruction conditionally causes the CPU to test the contents of a status register, or possibly compare two values, and either continues sequential execution or jumps to a new address, called the target address, based on the outcome of the test or comparison. A Call instruction causes the CPU to unconditionally jump to a new target address, but also saves the value of the program counter to allow the CPU to return to the program location it is leaving. A Return instruction causes the CPU to retrieve the value of the program counter that was saved by the last Call instruction, and return program flow back to the retrieved instruction address.

In early microprocessors, execution of program control instructions did not impose significant processing delays because such microprocessors were designed to execute only one instruction at a time. If the instruction being executed was a program control instruction, by the end of execution the microprocessor would know whether it should branch, and if it was supposed to branch, it would know the target address of the branch. Thus, whether the next instruction was sequential, or the result of a branch, it would be fetched and executed without significant delay.

However, modern microprocessors are not so simple. Rather, it is common for modern microprocessors to operate on several instructions at the same time within different blocks or pipeline stages of the microprocessor. Hennessy and Patterson define pipelining as, "an implementation technique whereby multiple instructions are overlapped in execution." Computer Architecture: A Quantitative Approach, second edition, by John L. Hennessy and David A. Patterson, Morgan Kaufmann Publishers, San Francisco, Calif., 1996. The authors go on to provide the following excellent illustration of pipelining:

"A pipeline is like an assembly line. In an automobile assembly line, there are many steps, each contributing something to the construction of the car. Each step operates in parallel with the other steps, though on a different car. In a computer pipeline, each step in the pipeline completes a part of an instruction. Like the assembly line, different steps are completing different parts of the different instructions in parallel. Each of these steps is called a pipe stage or a pipe segment. The stages are connected one to the next to form a pipe—instructions enter at one end, progress through the stages, and exit at the other end, just as cars would in an assembly line."

Thus, after instructions are fetched, they are introduced into one end of the pipeline. Then they proceed through pipeline stages within a microprocessor until they complete execution. In such pipelined microprocessors it is often not known whether a branch instruction will alter program flow until the instruction reaches a late stage in the pipeline. But, by this time, the microprocessor has already fetched other instructions and is executing them in earlier stages of the pipeline. If a branch causes a change in program flow, all of the instructions in the pipeline that followed the branch must be thrown out or flushed. In addition, the instruction specified by the target address of the branch instruction must be fetched. Throwing out the intermediate instructions and fetching the instruction at the target address creates processing delays in such pipelined microprocessors. To alleviate this delay problem, many pipelined microprocessors use branch prediction mechanisms in an early stage of the pipeline that predict the outcome of branch instructions, and then fetch subsequent instructions according to the branch prediction.

If the branch prediction logic correctly predicts the outcome of the branch then process flow continues forward from the target address of the branch taken. However, if the branch prediction logic incorrectly predicts the outcome of the branch, then the entire pipeline must be flushed and execution starts anew from the branch instruction forward. Branch mispredictions and the resultant flushing of the pipeline are undesirable due to the amount of time lost in restarting the pipeline at the resolved target address of the mispredicted branch.

As mentioned earlier, conditional or non-conditional branches are implemented by jump instructions. Jump instructions to an address within the same data segment as the jump instruction are called near jumps, while jump instructions to an address in a different data segment are called far jumps. Similarly, calls to an address within the same data segment as the call instruction are designated as near calls, while call instructions to an address in a different data segment are called far calls.

In conventional X86 pipeline microprocessors, the pipeline is flushed and refilled whenever a far jump or far call instruction is executed. This flushing action effectively slows down the operation of the microprocessor. In more detail, the execution of a far jump or far call instruction requires that a new code segment descriptor be loaded into the code segment descriptor register of the microprocessor. The term "far jump-call" is used collectively herein to indicate a far jump or far call instruction. The far jump-call instruction prescribes the new code segment descriptor along with an offset. This code segment descriptor includes a new code segment base address to which the offset is added to determine the far jump-call target address. Once this target address has been computed, it is provided to the next instruction pointer so that subsequent instructions beginning at the target address can be fetched and executed by the pipeline.

Current x86 pipeline processors either 1) do not perform any type of speculative branch for far jump-calls at all, or they 2) utilize a branch target buffer (BTB) for predicting far jump target addresses. In the 1st scenario, the new code segment descriptor corresponding to the segment of the far call instruction is loaded from memory and the target address of the far call is calculated when the far jump is executed, typically in a later pipeline stage. Unfortunately, in this scenario far jumps incur a penalty that is roughly equivalent to the number of stages in the pipeline between the stage where the far jump instruction is fetched and the stage where it is resolved. For pipeline microprocessor having only a few stages, the penalties associated with stalling the pipeline until resolution at a later stage are not sufficiently serious to merit any type of speculative branch logic for far jumps/calls. However, to increase microprocessor throughput, designers continue to decompose the pipeline logic into increasingly more stages. Hence, to provide no far jump prediction at all in a modern pipeline microprocessor will result in excessive pipeline delays associated with the execution of far jump-call instructions.

In the 2nd scenario, the branch target buffer (BTB) provides a small array in an early pipeline stage into which is stored the code segment base entries corresponding to the N most recently executed instructions (wherein N is an integer). The offset of a current far jump instruction is used to index into a far jump BTB. If a corresponding entry exists (i.e. a BTB hit), then the contents of the entry are provided to speculative address calculation logic for calculation of a speculative target address. Subsequent instructions are thus fetched from the speculative address forward. Unfortunately, in this scenario wherein a branch target buffer (BTB) is employed for prediction of far jump target addresses, if no corresponding entry exists in the BTB (i.e. a BTB miss), then the microprocessor pipeline will be stalled until the current far jump instruction is resolved. Also unfortunately, in this scenario, the same penalty is incurred as if no prediction logic had been employed whatsoever.

What is needed is a technique for performing branch prediction on far jumps and far calls in a manner which reduces the pipeline flushing penalties associated with far jumps and calls. Moreover, a mechanism is needed for increasing microprocessor efficiency when far jumps/calls are encountered even when branch target buffer misses occur.

SUMMARY OF THE INVENTION

The present invention contemplates a microprocessor apparatus within a microprocessor, for providing a fallback far jump-call speculative target address that corresponds to a current far jump-call branch instruction. The microprocessor apparatus includes a far jump-call branch target buffer and a fallback speculative target address generator. The far jump-call branch target buffer stores a plurality of code segment bases and offsets corresponding to a plurality of previously executed far jump-call branch instructions, and determines if a hit for the current far jump-call branch instruction is contained therein. The fallback speculative target address generator is coupled to the far jump-call branch target buffer. In the event of a miss in the far jump-call branch target buffer, the fall back speculative target address generator generates the fallback far jump-call speculative target address from a current code segment base and a target offset, the target offset corresponding to the current far jump-call branch instruction.

One aspect of the present invention provides a method for providing a fallback far jump-call speculative address in a microprocessor. The method includes testing a far jump-call branch target buffer to determine if a hit for a current far jump-call branch instruction is contained therein, wherein the buffer stores a plurality of the code segment bases and offsets that correspond to a plurality of previously executed far jump-call instructions; and in the event of a miss in the buffer, generating the fallback far jump-call speculative address from a current code segment base and a target offset, where the target offsets corresponds to the current jump-call branch instruction.

Other features and advantages of the present invention will become apparent upon study of the remaining portions of the specification and drawings.

BRIEF DESCRIPTION OF THE DRAWINGS

These and other objects, features, and advantages of the present invention will become better understood with regard to the following description, and accompanying drawings where.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

Figure 1:
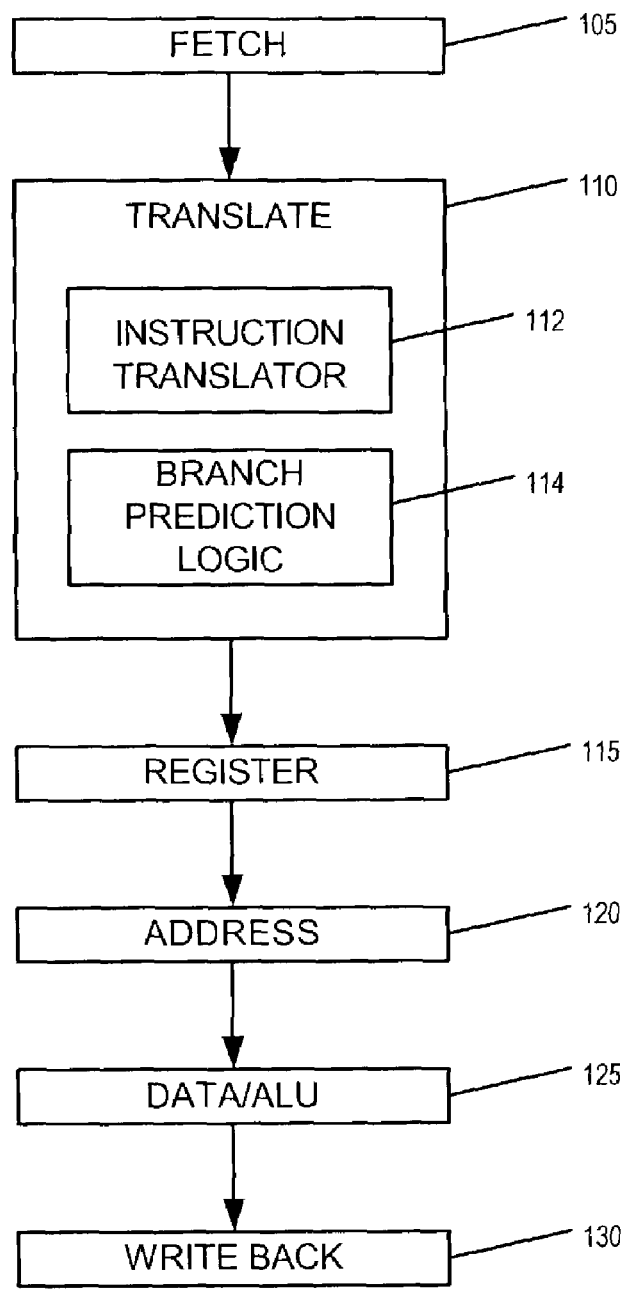
FIG. 1 is a block diagram of the pipeline stages of a conventional microprocessor.

FIG. 1 is a block diagram of a pipelined microprocessor 100 which employs conventional branch prediction technology. Microprocessor 100 includes a fetch stage 105, a translate stage 110, a register stage 115, an address stage 120, a data/ALU execution stage 125 and a write back stage 130.

Operationally, fetch stage 105 fetches macro instructions from memory (not shown) that are to be executed by microprocessor 100. Translate stage 110 includes a translator 112 that translates the fetched macro instructions into associated micro instructions. Translate stage 112 employs conventional branch prediction logic 114. Each micro instruction generates by translator 112 directs microprocessor 100 to perform a specific subtask related to accomplishment of an overall operation specified by a fetched macro instruction. Register stage 115 retrieves operands specified by the micro instructions from a register file (not shown) for use by later stages in the pipeline. Address stage 120 calculates memory addresses specified by the micro instructions to be used in data storage and retrieval operations. Data/ALU execution stage 125 either performs arithmetic logic unit (ALU) operations on data retrieved from the register file, or reads/writes data from/to memory using the memory address calculated in address stage 120. Write back stage 130 writes the result of a data read operation, or an ALU operation, to the register file. Thus, to review, macro instructions are fetched by fetch stage 105 and are translated into micro instructions by translate stage 110. The translated micro instructions proceed through stages 115–130 for execution. Pipeline operation is thus provided by microprocessor 100.

Translate stage 110 employs conventional BTB branch prediction to increase the efficiency of the pipeline as discussed earlier. A significant disadvantage of this conventional microprocessor branch prediction technology is that the pipeline is flushed in many situations where the execution logic computes the target address corresponding to a far jump-call instruction. When flushing occurs the microprocessor stalls As mentioned earlier, current x86 pipelined microprocessors are known to handle far jump-call instructions by either 1) not performing any type of speculative branch prediction or 2) performing speculative branches which are prescribed simply in terms of a branch target address. In the 2nd approach which employs a branch target buffer (BTB) containing the target addresses of previously taken branches, if an entry for a particular far jump or call does not exist in the BTB (i.e. when a BTB miss occurs), then the pipeline of the processor is stalled until the current far jump instruction is resolved. Unfortunately, this results in incurring substantially the same penalty as if no branch prediction logic were used at all, namely the pipeline is flushed and restarted.

The inventors of the technology disclosed herein have recognized that, particularly with regard to legacy code, a significant percentage of far jumps/calls do not modify the current code segment base. Thus, even when a far jump BTB miss occurs, it is very likely that the target address for a far jump is within the same code segment as that of the far jump instruction itself, i.e. the current code segment. The disclosed technology employs an advanced branch target buffer mechanism which is capable of providing a secondary or fallback branch target address should there be a BTB miss for a particular far jump-call branch instruction. In this manner the number of pipeline stalls resulting from encountering far jump and far call instructions is advantageously reduced.

Figure 2:
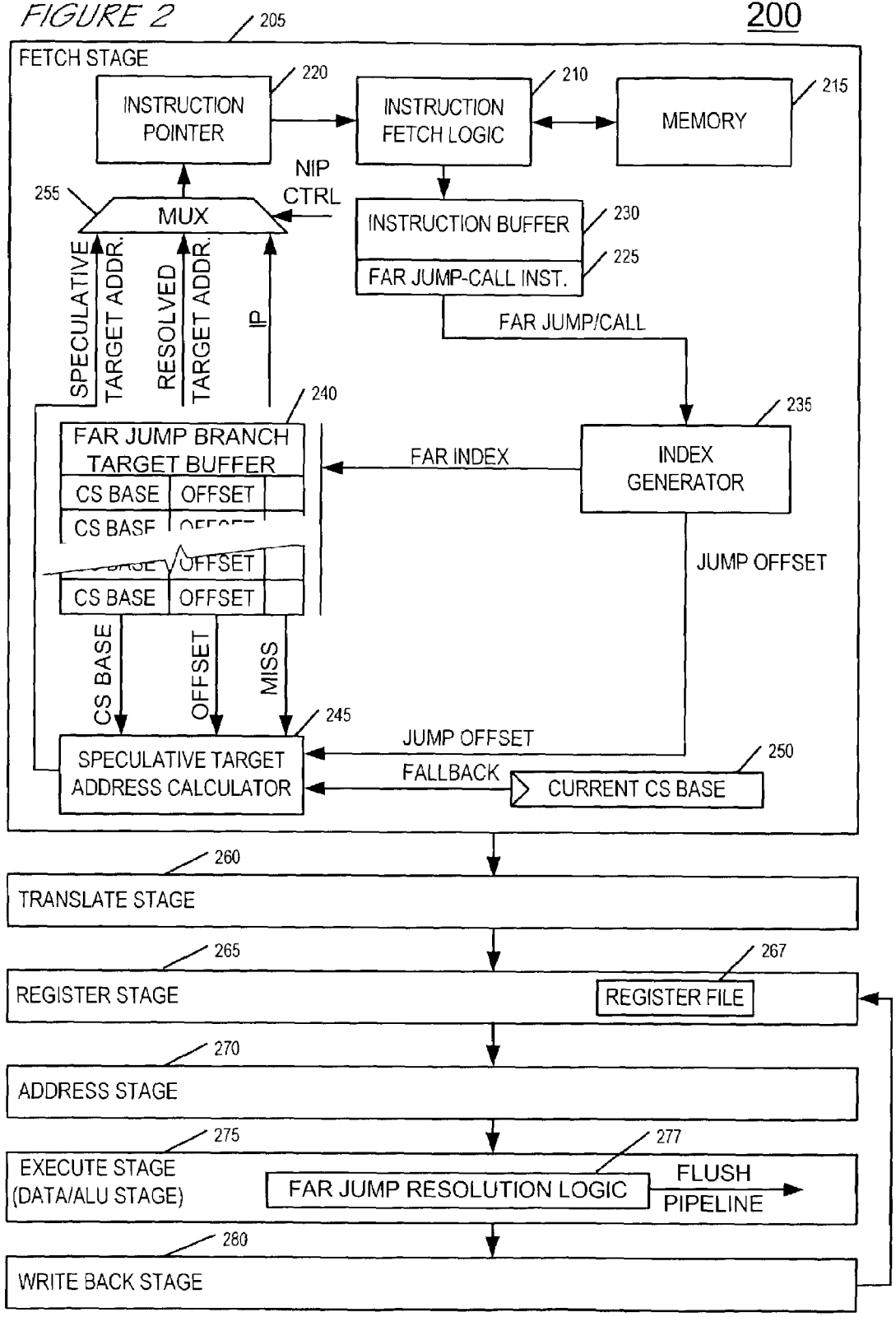
FIG. 2 is a block diagram of the disclosed microprocessor.

To provide more detail, FIG. 2 is a block diagram of a microprocessor 200 which speculatively executes far jumps and calls in the manner described above to significantly increase pipeline efficiency. Microprocessor 200 includes a fetch stage 205. Fetch stage 205 includes instruction fetch logic 210 which fetches macro instructions from a memory 215 coupled thereto. In more detail, an instruction pointer 220 is coupled to instruction fetch logic 210 to inform instruction fetch logic 210 of the next memory location from which an instruction should be fetched. The instruction thus fetched is designated as instruction 225. In one embodiment, instruction fetch logic 210 fetches far call/jump instructions and channels them to an instruction buffer 230 which is coupled to instruction fetch logic 210. Instruction buffer 230 is coupled to an index generator 235 such that far jump-call instructions from buffer 230 are supplied thereto.

Microprocessor 200 includes a far jump branch target buffer (BTB) 240 which is coupled to the far index output of index generator 235 as shown. A far index associated with each far jump-call instruction received from buffer 230 is provided to BTB 240 as will be described in more detail subsequently. BTB 240 stores the N most recently executed far jump-call instructions. (N is an integer.) More particularly, BTB 240 stores the code segment base (CS Base) and offset corresponding to each of the N recently executed far jump-call instructions. When a far jump-call instruction is received by index generator 235, an index into BTB 240 is generated which corresponds to that instruction's offset. In one embodiment, index generator 235 takes the lowest 4 bits of the 48 bit logical address of a particular far jump-call instruction and uses it as the far index into BTB 240. The remaining upper bits are effectively removed. These lower 4 bits constitute the offset of the current far jump instruction. In other words, the far index into BTB 240 corresponds to the current far jump-call instruction's offset. In an alternative embodiment this 4 bit table is multiplied by 8 ways to provide an 8 way buffer employing BTB logic (not shown) which controls the content, updating and filling of the entries in each of the 8 ways. In other words, the alternative embodiment is an 8 way embodiment employing the lower 4 bits of the instruction pointer (IP) as an index.

If there is a BTB hit, namely if there is an entry in BTB 240 which corresponds to the offset of the current far jump-call instruction, then BTB 240 provides the corresponding speculative segment base and speculative offset to a speculative address calculator 245. Speculative address calculator 245 is coupled to BTB 240 as shown. More particularly, the CS base output, offset output and miss output of BTB 240 are coupled to respective inputs of speculative target address calculator 245. Index generator 235 includes a jump offset output which is coupled to speculative target address calculator 245 so that the offset of the current far jump-call instruction is provided to calculator 245. The CS base of the current far jump-call instruction is indicated as current CS base 250 and is provided to an input of speculative target address calculator 245 as shown in FIG. 2.

When the miss output of BTB 240 goes low, this indicates a far jump-call BTB miss, namely that the offset of the current far jump-call instruction is not currently stored within BTB 240. In this case, BTB 240 has not stored the target address (i.e. CS base and offset) associated with the current far jump-call instruction for which the far index is provided. However, when the miss output of BTB 240 goes high this indicates a far jump-call BTB hit, namely that the offset of the current far jump-call instruction is currently stored within BTB 240. In this case, BTB 240 has effectively stored the target address (i.e. CS base and offset) associated with the current far jump-call instruction for which the far index is provided. The high/low logic discussed above may of course be inverted according to the convention selected by the designer.

If upon indexing into BTB 240 for a current far jump-call instruction there is a BTB hit, then a corresponding speculative code segment base and speculative offset are sent to speculative target address calculator 245. Calculator 245 then determines a speculative target address using the CS base and offset information, such speculative target address being referred to as the primary speculative target address. Execution then continues from the speculative target address forward. In more detail, speculative target address generator 245 is connected to the speculative target address input of a three input multiplexer 255. The output of multiplexer 255 is coupled to the input of next instruction pointer 220. The remaining 2 inputs of multiplexer 255 are the resolved target address input to which the resolved target address is provided and the next instruction pointer (NIP) input. Switching among these 3 inputs as appropriate for each instruction is provided by a next instruction pointer control (NIP CTRL) signal which is supplied to multiplexer 255.

The scenario of a BTB far jump-call target hit was just discussed. The scenario of a BTB far jump-call target miss will now be described. In this scenario, indexing into BTB 240 using the offset of the current far jump-call instruction did not result in an entry corresponding to the current far jump-call instruction. Speculative target address calculator 245 calculates a fallback or secondary speculative target address using the current code segment base and the far jump target offset which is extracted from the current far jump-call instruction. Thus, in the event of a BTB miss, rather than having no speculative target address available and consequently flushing the pipeline, a fallback or secondary target address is speculatively provided. It is very likely that the target address (i.e. CS base and offset) for the far jump-call instruction is within the same code segment as the far jump instruction itself. When this is the case, flushing of the pipeline and the resultant stalling of the microprocessor are advantageously avoided.

Fetch stage 205 is coupled to a translate stage 260 which translates each fetched macro instruction provided thereto into associated micro instructions which carry out the function indicated by the macro instruction.

From translate stage 260 the translated micro instructions are fed to register stage 265. Register stage 265 retrieves operands specified by each micro instruction from a register file 267 for use by later stages in the pipeline.

Register stage 265 is coupled forward to an address stage 270 which includes address logic that calculates memory addresses specified by the micro instructions received from register stage 265 to be used in data storage and retrieval operations.

Address stage 270 is coupled forward to execute stage 275 which is also called the data/ALU execute stage. Execute stage 275 performs arithmetic logic unit (ALU) operations on data retrieved from register file 267 or reads/writes data from/to memory using the memory address calculated in address stage 270.

Execute stage 275 includes far jump-call resolution logic 277 having a flush pipeline output which when toggled causes the instruction pipeline to be flushed. When the far jump-call instruction is ultimately executed by execute stage 275, the actual target address of the far jump-call instruction is finally determined and resolved. Far jump resolution logic 277 conducts a test to determine if the actual target address of the far jump-call is the same as the predicted speculative target address for the far jump-call. If the actual target address is the same as the speculative target address, then the branch prediction was correct and the pipeline is not flushed. This avoids stalling the microprocessor and the delay that would otherwise result. However, if far jump resolution logic 277 determines that the actual target address is not the same as the speculative target address, then the branch prediction was wrong and the pipeline is flushed.

A write back stage 280 is coupled to execute stage 275 as shown. Write back stage 280 writes the result of a data read operation, or an ALU operation, to register file 267. In summary, macro instructions are fetched from memory 215 by fetch stage 205 and are translated into micro instructions by translate stage 260, and the micro instructions proceed in pipeline fashion through stages 265–280 for execution.

Figure 3:
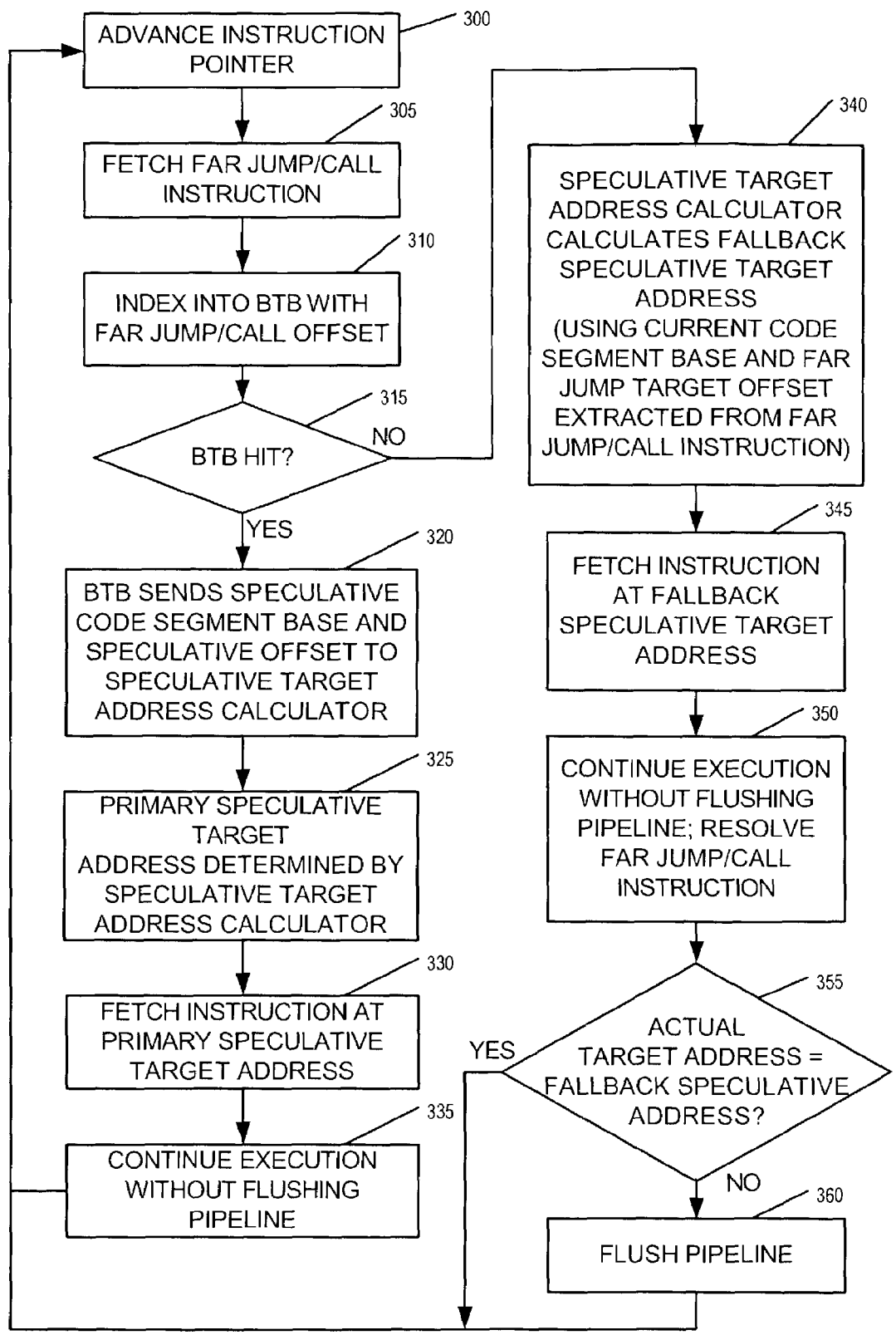
FIG. 3 is a flow chart depicting the operation of far jump resolution logic in the pipeline of the disclosed microprocessor.

FIG. 3 is a flow chart showing the process flow of the advanced branch prediction mechanism employed in fetch stage 205 of microprocessor 200. The instruction pointer is advanced as per block 300 and an instruction is fetched at the address denoted by the instruction pointer as per block 305. In this example, the fetched instruction is a far jump or a far call (far jump-call) instruction. When a far jump-call instruction is encountered, an index into the far jump branch target buffer (BTB) 240 is generated, such index corresponding to the offset of the particular far jump-call instruction as per block 310.

A test is then conducted as per decision block 315 to determine if there is a BTB hit. In other words a test is conducted to see if the offset used as an index is already present in BTB 240. If the offset is present in the BTB then we have a BTB hit and the corresponding speculative code segment base and speculative offset are sent from BTB 240 to a speculative target address calculator as per block 320. The speculative target address calculator adds the speculative offset to the speculative code segment base to determine the speculative target address as per block 325. The speculative target address determined at block 325 is called the primary speculative target address. The instruction located at the speculative target address is then fetched as per block 330. Execution of instructions then continues as per block 335 from this point forward without flushing the pipeline provided that the far jump-call instruction is ultimately found to be taken once the far jump-call instruction is executed and resolved at a later stage of the pipeline.

If at decision block 315 it is found that the offset of the far jump which is used as an index is not present within BTB 240 then we have a BTB miss situation. In this case, a fallback or secondary speculative target address is calculated to avoid flushing the pipeline. The speculative target address calculator adds the far jump-call target offset of the current far jump-call instruction to the current code segment base to provide a speculative target address as per block 340. The instruction at the speculative target address is fetched as per block 345. Thus, even though we have a BTB miss, a situation that would normally cause a pipeline flush, a speculative target address is nevertheless determined so that execution of instructions can continue without flushing the pipeline as per block 350. In more detail, the current far jump-call instruction continues to propagate through the instruction pipeline until the actual target address of the far jump-call is ultimately determined and resolved as per block 350. A test is conducted at decision block 355, by far jump resolution logic, to determine if the actual target address of the far jump-call is the same as the speculative target address for the far jump-call. If the actual target address is the same as the fallback speculative target address, then all is well because the branch prediction was correct and the pipeline is not flushed. Many clock cycles of delay are advantageously avoided. Process flow continues back to advance instruction pointer block 300. However, if it is determined that the actual target address is not the same as the fallback speculative target address, then the branch prediction was wrong and the pipeline is flushed as per block 360.

The above description with reference to FIGS. 2–3 has illustrated an apparatus and a method for providing a processor with a branch prediction mechanism for far jump and far call instructions. The described embodiment reduces the penalties associated with the execution of far jump-call instructions. Although the present invention and its objects, features, and advantages have been described in detail, other embodiments are encompassed by the invention. In addition to implementations of the invention using hardware, the invention can be embodied in computer readable program code (e.g., software) disposed, for example, in a computer usable (e.g., readable) medium configured to store the code. The code causes the enablement of the functions, fabrication, modeling, simulation and/or testing, of the invention disclosed herein. For example, this can be accomplished through the use of computer readable program code in the form of general programming languages (e.g., C, C++, etc.), GDSII, hardware description languages (HDL) including Verilog HDL, VHDL, AHDL (Altera Hardware Description Language) and so on, or other databases, programming and/or circuit (i.e., schematic) capture tools available in the art. The code can be disposed in any known computer usable medium including semiconductor memory, magnetic disk, optical disc (e.g., CD-ROM, DVD-ROM, etc.) and as a computer data signal embodied in a computer usable (e.g., readable) transmission medium (e.g., carrier wave or any other medium including digital, optical or analog-based medium). As such, the code can be transmitted over communication networks including the Internet and intranets. It is understood that the functions accomplished and/or structure provided by the invention as described above can be represented in a processor that is embodied in code (e.g., HDL, GDSII, etc.) and may be transformed to hardware as part of the production of integrated circuits. Also, the invention may be embodied as a combination of hardware and code.

Moreover, although the present invention has been described with reference to particular apparatus and method, other alternative embodiments may used without departing from the scope of the invention.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

What is claimed is:

1. A microprocessor apparatus within a microprocessor, for providing a fallback far jump-call speculative target address that corresponds to a current far jump-call branch instruction, the microprocessor apparatus comprising:
  a far jump-call branch target buffer, configured to store a plurality of code segment bases and offsets corresponding to a plurality of previously executed far jump-call branch instructions, and configured to determine if a hit for the current far jump-call branch instruction is contained therein; and
  a fallback speculative target address generator, coupled to said far jump-call branch target buffer which, in the event of a miss in said far jump-call branch target buffer, said fall back speculative target address generator generates the fallback far jump-call speculative target address from a current code segment base and a target offset, said target offset corresponding to the current far jump-call branch instruction.

2. The microprocessor apparatus as recited in claim 1, wherein said fallback speculative target address generator adds said current code segment base and said target offset together to determine the fallback far jump-call speculative target address.

3. The microprocessor apparatus as recited in claim 1, further comprising:
  an index generator, coupled to said far jump-call branch target buffer, for generating a far index by removing a predetermined number of high order bits from an address corresponding to the current far jump-call instruction.

4. The microprocessor apparatus as recited in claim 2, wherein said speculative target address generator comprises:
  a code segment base input, coupled to said far jump-call branch target buffer, configured to receive code segment base information therefrom.

5. The microprocessor apparatus as recited in claim 2, wherein said speculative target address generator further comprises:
  an offset input, coupled to said far jump-call branch target buffer, configured to receive offset information therefrom.

6. The microprocessor apparatus as recited in claim 2, wherein said speculative target address generator further comprises:
  a miss input, coupled to said far jump-call branch target buffer, configured to receive miss information therefrom.

7. The microprocessor apparatus as recited in claim 1, further comprising:
  an execute stage, configured to receive and execute the current far jump-call branch instruction, and configured to determine an actual far jump-call target address that corresponds to the current far jump-call branch instruction.

8. The microprocessor apparatus as recited in claim 7, wherein said execute stage comprises:
  far jump resolution logic, for comparing the fallback far jump-call speculative target address with said actual far jump-call target address.

9. The microprocessor apparatus as recited in claim 8, wherein said far jump-call resolution logic directs the microprocessor to flush its pipeline when the fallback far jump-call speculative target address is not the same as said actual far jump-call target address, and otherwise permits execution of instructions to continue.

10. A method for providing a fallback far jump-call speculative address in a microprocessor, the method comprising:
  testing a far jump-call branch target buffer to determine if a hit for a current far jump-call branch instruction is contained therein, wherein the buffer stores a plurality of the code segment bases and offsets that correspond to a plurality of previously executed far jump-call instructions; and
  in the event of a miss in the buffer, generating the fallback far jump-call speculative address from a current code segment base and a target offset, where the target offset corresponds to the current jump-call branch instruction.

11. The method as recited in claim 10, further comprising:
  in the event of the miss in the buffer, fetching a target instruction at the fallback far jump-call speculative address.

12. The method as recited in claim 10 further comprising:
executing the current far jump-call branch instruction until the current far jump-call branch instruction is resolved; and determining an actual target address of the current far jump-call branch instruction.

13. The method as recited in claim 12, further comprising:

comparing the actual target address of the current far jump-call branch instruction with the fallback far jump-call speculative address.

14. The method as recited in claim 12, further comprising:
continuing execution by the microprocessor if the actual target address of the current far jump-call branch instruction is found to be the same as the fallback far jump-call speculative address.

15. The method as recited in claim 13, further comprising:
directing the microprocessor to flush its instruction pipeline if the actual target address is not found to be the same as the fallback far jump-call speculative address.

* * * * *